United States Patent [19]

Wester et al.

[11] 4,083,279
[45] Apr. 11, 1978

[54] APPARATUS FOR CHOPPING STRAND

[75] Inventors: Thomas Joseph Wester; Svend Aage Petersen, both of Toledo, Ohio

[73] Assignee: Johns-Manville Corporation, Denver, Colo.

[21] Appl. No.: 684,528

[22] Filed: May 10, 1976

[51] Int. Cl.² .............................................. D01G 1/04
[52] U.S. Cl. ....................................... 83/347; 83/348; 83/673; 83/698; 83/913
[58] Field of Search ................. 83/344, 346, 347, 348, 83/673, 674, 665, 698, 913; 30/128, 180

[56] References Cited

U.S. PATENT DOCUMENTS

| | | | |
|---|---|---|---|
| 2,729,028 | 1/1956 | Slayter et al. | 83/913 X |
| 2,787,314 | 4/1957 | Anderson | 30/128 UX |
| 3,118,336 | 1/1964 | Hampshire | 83/913 X |
| 3,130,619 | 4/1964 | Faro | 83/913 X |
| 3,644,109 | 2/1972 | Klink et al. | 83/913 X |
| 3,763,561 | 10/1973 | Suharfenberger | 83/913 X |
| 3,771,399 | 11/1973 | Aterianus | 83/348 |

*Primary Examiner*—J. M. Meister
*Attorney, Agent, or Firm*—Robert M. Krone; Joseph J. Kelly; Patricia B. Walker

[57] ABSTRACT

A blade roll for a chopper of glass fiber strands having elastomer means for supporting the blades and blade retaining means to cooperate with the elastomeric means for restraining movement of the blades in both a circumferential and radially outward direction.

11 Claims, 5 Drawing Figures

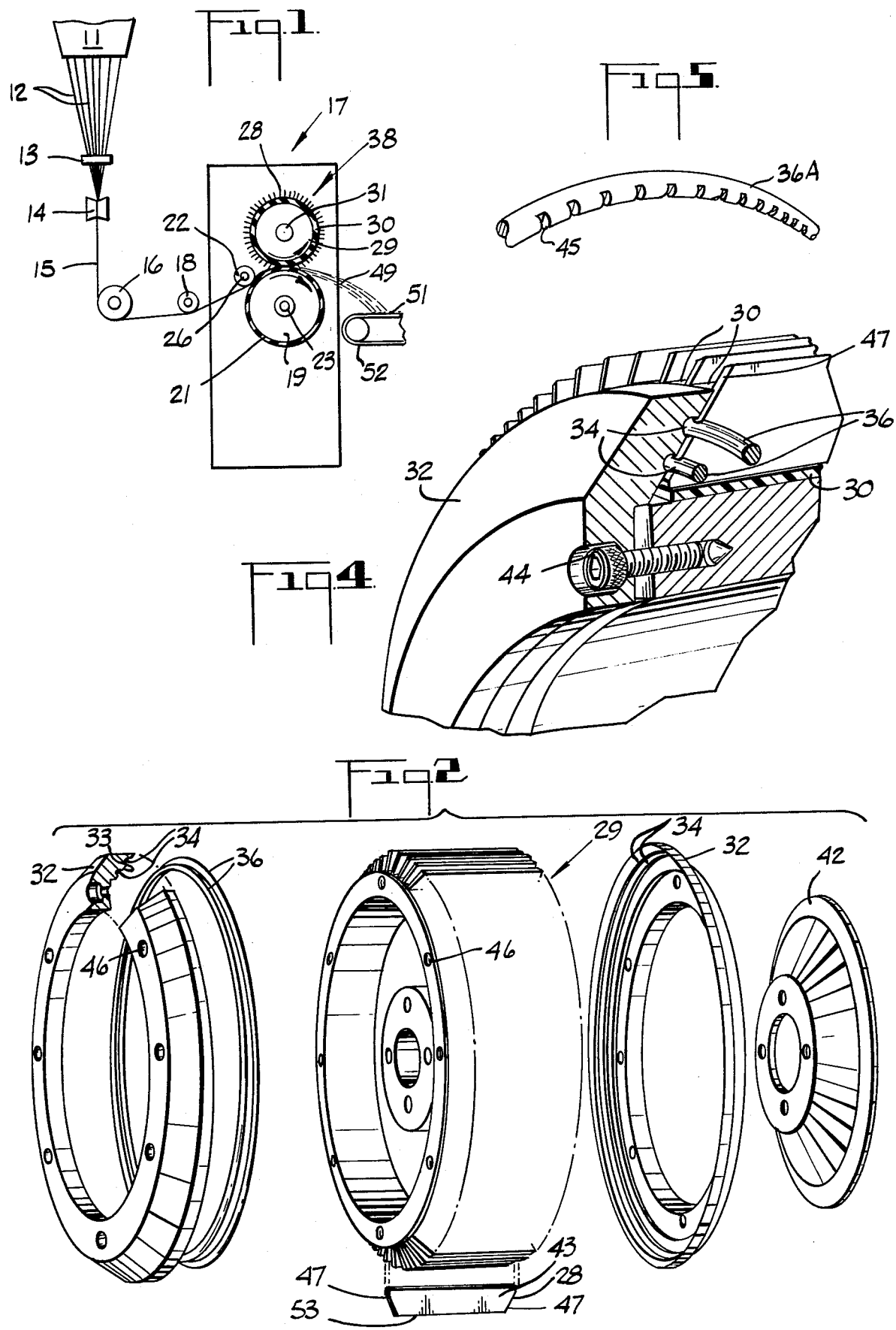

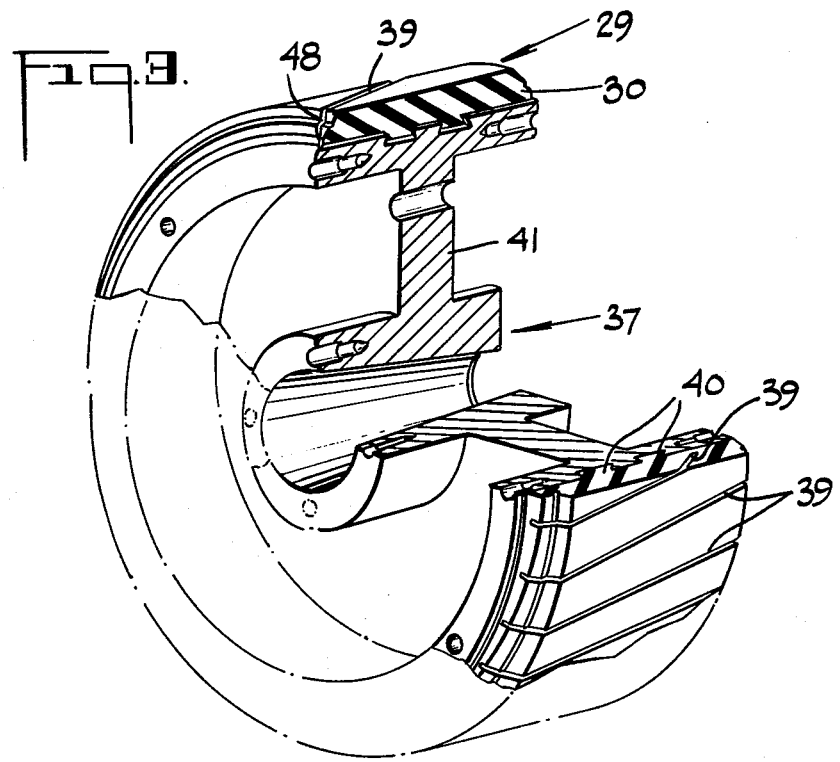

APPARATUS FOR CHOPPING STRAND

BACKGROUND OF THE INVENTION

1. Field of the Invention

The present invention relates to a chopper assembly for cutting fibers into short lengths and is particularly applicable to the severing of glass fiber strands. More particularly, the present invention relates to a blade roll for use with the chopper assembly.

2. Description of Prior Art

Heretofore it has been known to sever linear materials into regular lengths by passing the material between a backup roll and a blade roll with a series of blades mounted and spaced evenly about its periphery and projecting radially therefrom.

A typical prior art blade roll comprises a stainless steel cylindrical member which has been milled with a plurality of slots. Cutting blades are subsequently positioned within the milled slots. In the past, the slots have been milled to have a thickness larger than the section of the chopper blade to be mounted therein in order to avoid the excessive cost of milling each slot to the exact width of an individual chopper blade. By milling the slots to be somewhat larger than the chopper blades, (e.g 0.002–0.004 in. as taught in U.S. Pat. No. 3,869,268) the blades tend to vibrate within the slots during the operation of the blade roll. This vibration causes the chopper blades to wear more rapidly and thus shortens the effective life of the chopper blade. The prior art as disclosed in U.S. Pat. No. 3,508,461 in order to more firmly hold the chopper blades in position in the blade roll, incorporated a resilient gasket which is mounted in contact with the end edges of the blades positioned in the blade roll and by an end cap which is fastened securely to the blade roll. It is necessary to tightly fasten the end caps against the gasket in order to rigidly fix the blades so as to prevent their outward movement from the blade roll member, but this often results in the blades cutting through the resilient gasket entirely. This cutting or tearing apart of the gasket not only destroys the ability of the gasket to retain the chopper blades in position, but also creates other hazards as well since fragments of the gasket may fly out and contaminate the material being chopped or may actually strike an operator of the chopper assembly.

U.S. Pat. No. 3,664,109 discloses protrusions 51 and 51A to restrain movement in a circumferential direction.

U.S. Pat. Nos. 3,130,619 and 3,118,336 disclose blade rolls which are comprised of plastic or rubber like materials, but neither reference suggests milling slots in the blade roll to support the blades. More particularly, U.S. Pat. No. 3,118,336 utilizes a complex system of wires to hold embedded blades in position. U.S. Pat. No. 3,130,619 also embeds a plurality of blades in its blade roll which is preferably comprised of Teflon (registered Trademark of E. I. DuPont). Embedding the blades in the blade roll material has several disadvantages, including a more costly initial construction, and the inconvenience and difficulty of replacing worn out blades.

Accordingly, it is an object of the present invention to overcome the disadvantages of prior art blade rolls by providing a blade roll which increases the effective chopping life of the blades.

It is a further object of the present invention to provide a blade roll for use in a chopper assembly which substantially eliminates undesirable vibration of the chopper blades mounted within the blade roll member.

Accordingly, the present invention provides a cylindrical blade roll having an axis of rotation along its center line for use in a chopper assembly for cutting fibers into short lengths comprising a blade roll cylinder member; a plurality of chopper blades projecting generally radially therefrom, each of the blades having a cutting edge, a base portion, and two sides; and blade retaining means. In the preferred embodiment, the blade roll cylinder member comprises a rotatable core having a resilient, durable elastomer affixed about the outer circumferential surface of the core wherein the elastomer has a cylindrical outer surface configuration with a plurality of milled slots extending generally lengthwise of the blade roll cylinder member. These milled slots have a thickness slightly less than the greatest thickness of the portion of the chopper blades inserted into the slots so that the sides of the slots tend to grip the portion of the chopper blades.

The present invention further provides an improved blade retaining means comprising an annular blade retainer positioned at each end of the blade roll cylinder member wherein a side surface of each of the blade retainers has at least one annular groove therearound which in the preferred embodiment is situated radially inwardly of the outer diameter of the blade roll cylinder member when the center line of the blade retainer is in alignment with the center line of the blade roll cylinder member. A blade retaining ring is positioned partially within the at least one annular groove of each blade retainer so that the blade retaining rings engage the chopper blades at each end thereof to restrain the chopper blades against movement in a circumferential direction.

DESCRIPTION OF THE DRAWINGS

FIG. 1 is a diagramatic front elevation of a chopper assembly and its associated equipment for drawing continuous filaments from a source and advancing those filaments between a blade roll and backup roll to a collection conveyor;

FIG. 2 is a disassembled perspective view of the blade roll of FIG. 1;

FIG. 3 is a partially broken away perspective of a blade roll cylinder member constructed in accordance with one aspect of the present invention;

FIG. 4 is an assembled section of the blade roll in perspective;

FIG. 5 is a broken perspective of a blade retainer ring after use in accordance with the present invention.

DETAILED DESCRIPTION OF THE PREFERRED EMBODIMENTS

The apparatus illustrated in FIG. 1, with the exception of the specific construction of the blade roll 29, is that described and illustrated in FIG. 1 of U.S. Pat. No. 3,815,461, which is incorporated into the specification by reference thereto.

In a preferred embodiment of the present invention, the blade roll cylindrical member 29 comprises a resilient, durable elastomer tire 30 which is affixed to a core 41 of the blade roll cylinder member 29.

The core 41 may be comprised of any suitable material, e.g. stainless steel. The tire 30 may be cast on the core 41 in a mold and affixed to the outer surface thereof by the formation of dove-tail shaped projections 40 which prevent the coating from pulling away from the core 41. The core 41 further includes a centrally located open cylindrical hub suitable for mounting on the shaft 31. This hub narrows as at 37 for frictional engagement with the shaft so as to drive the blade roll when the shaft is rotated.

As illustrated in FIG. 3, the blades 28 preferably are generally trapazoidal in plan view with the cutting edge 53 on the smaller parallel side. The portion 43 of the blade 28 closer to the larger parallel side including the generally rectangular area is adapted to be positioned in slots 39 in the tire 30. The sides 47 of the blade 28 cooperate with the blade retainers 32 to prevent the blades from moving radially outwardly from the slots.

As noted above, it was known to mill slots in a stainless steel core and to position the chopper blades therein. However, due to the variations inherent in normal milling procedures and in the thickness of the base of the chopper blades, it was common to mill the slots to a width slightly greater than the thickness of the mounting portion (base) of the chopper blades so as to facilitate insertion of the chopper blades into the slots. Although this difference was often very slight, e.g. 0.002–0.004 inch greater than the thickness of the base of the blade, it permitted the chopper blades to vibrate within the slot and thus decrease the effective life of the chopper blade due to more rapid wear of the cutting edge. Also, this vibration, especially when coupled with means to securely hold the end portion of the blades, resulted in excessive strain on the blades which frequently caused the blades to break and the broken portions to fly out from the blade roll. According to the present invention, these disadvantages are eliminated by utilizing a resilient, durable elastomer tire on the blade roll cylinder member. Slots 39 are milled in the resilient elastomer tire 30 to a thickness slightly less than (e.g. 0.0005 to 0.001 inch) the thickness of the portion 43 of the chopper blade 28. As shown in FIGS. 3 and 4, the slots 39 are milled to a depth less than the thickness of the elastomer tire 30. With such an arrangement, the portion 43 of each chopper blade 28 is held securely within its corresponding slot 39 and excessive vibration is eliminated, thereby increasing the effective chopper blade life by 30-40%. Also, noise levels from the operation of the assembly are reduced due to the damping characteristics of the elastomer and the initial manufacturing cost is substantially lower than that for the prior art blade rolls.

The resilient, durable elastomer tire 30 should have a Shore A hardness which is greater than the hardness of the material coating the backup roll 19. One suitable combination would be a polyurethane having a 100 ±5 durometer Shore A hardness for use as the tire 30 and a polyurethane having a Shore A hardness of 83 ±2 durometer for coating the backup roll 19. Other elastomeric materials may be suitable for use as the elastomer in the tire 30, but any material utilized must have a high abrasion resistance, must be capable of being milled, must be capable of being elongated and returning to its original form without serious deformation, and must not be subject to "cold flow," that is permanently deforming in response to strain.

The urethane tire 30 is provided with a notch 48 situated on each lateral edge approximately half way between the surface of the core 41 and the outer circumferential surface of the tire 30. This notch is provided so that even if the elastomer surface expands during operation of the blade roll, the ends of the blades situated in the slots will still contact the blade retaining means.

The depth of the slots in the elastomer coating 30 are not critical, but the slots must be deep enough to hold securely at least the base portion 43 of the chopper blade in position in the blade roll cylinder member. The slots 39 extend in an axial direction at a slight angle (e.g. between 5° and 20°) with respect to the axis of rotation of the blade roll cylinder member 29. The chopper blades 28 protrude radially outwardly from the circumferential surface of the tire 30 to a height which is normally about one-fourth the depth of the slots. It has been useful to use slots having a depth of about 0.5 inch with a blade having a height of about 0.625 inch so that the blade protrudes about 0.125 inch and a blade thickness of about 0.040 inch along its base 43. The blades 28 extend in an axial direction a distance slightly greater than the axial extent of the slots 39 so that each side of the blade protrudes in an axial direction from the tire 30. With this construction the blades are securely held in position in the blade roll cylinder 29 and the urethane coating on which the blades are seated absorbs the shock imposed when cutting the strands 15.

The urethane facing 21 on the backup roll 19 wears under the chopper blades 28. Such wear is accommodated in part by arranging for relative movement between the blade roll 38 and the backup roll 19. The backup roll 19 can be reversed so that its strand starter region, that region unobstructed by the chopper blade 28, can be interchanged with its chopping region, that portion contacted by the blades. Furthermore, the urethane facing 21 can be replaced as can be the urethane coating 30.

In addition to the blade roll cylinder member and the chopper blades, the blade roll 38 further includes blade retaining means. A preferred embodiment of a suitable blade retaining means is illustrated in FIGS. 2 and 4. A pair of annular blade retainers 32 having inwardly directed flanges 33 with slopes matching the incline of the trapezoidal blades 28 (e.g. 60° with respect to the axis of rotation of the blade roll 38) are secured to the ends of the core 41 of the blade roll cylinder member 29. The blade roll cylinder member 29 and the annular blade retainers 32 may be constructed with aligning holes, as at 46, through which socket head cap screws 44 may be threaded so as to fasten the blade retainer to the side of the blade roll cylinder member. Other conventional fastening means could be employed if desired, so long as the blade retaining means contacts the ends of the chopper blades. A blade roll end cover 42 finishes each end face of the blade roll 38.

As illustrated in FIG. 2, retainers 32 have annular grooves 34 in the inwardly directed flanges 33. Blade retaining rings 36 are partially positioned within each annular groove 34 such that the blade retaining rings will engage the ends of the chopper blades to hold the chopper blades in position in the blade roll cylinder member when the blade retainers are in place at the ends of the blade roll cylinder member 29. Thus, the blade retaining rings 36 will accomodate any dimensional differences in components. By positioning a portion of the blade retaining rings within the annular grooves 34 the chopper blades 28 cannot completely sever the retaining rings and therefore the prior art disadvantage of having portions of the retaining means severed by the edges of the blades such that portions fly out from the assembly during operation is eliminated.

Although the inwardly directed flange 33 of each blade retainer 32 may be supplied with only one annular groove 34, it is preferred that each flange be designed with two or more annular grooves. Also, the grooves as illustrated preferably have a diameter less than the diameter of the outer surface of the tire 30. However, it is possible to provide a groove having a diameter greater than the diameter of the outer surface of the tire 30. Providing two blade retaining rings per blade retainer instead of one blade retaining ring per blade retainer reduces the stress on the blade retaining ring by a factor of 2. Therefore, to decrease the amount of load per unit area of the blade retaining ring to minimize safety hazards, it is preferable to use more than one retaining ring in each blade retainer. Each annular groove is supplied with one blade retaining ring 36.

It has been found that copper is an especially suitable material for use as the blade retaining rings 36. As force is applied to the retainers 32 when the screws 44 are tightened, the copper is crushed by the blades and will "cold flow" around and grip the ends of the chopper blades 28. After such force has been applied and the chopper assembly 17 is ready for use, the chopper blade retaining rings will have the configuration as shown in FIG. 5 and represented by reference numeral 36a. As illustrated in FIGS. 3 and 4, the axial length of the chopper blades 28 is slightly longer than the axial length of the slots 39. Therefore, initially the axial extremities of the tire 30 do not contact the axially inward surfaces of the retainers 32. From this figure, it is apparent that the sides 47 of the chopper blades 28 have produced a series of indentations 45 in the retaining rings. These indentations do not go through the entire ring, since even at the greatest dimensional tolerance, movement of the chopper blades into the copper rings 36 will be stopped if they contact the blade retainer 32 which is preferably constructed of a high strength steel alloy due to the high stress loading resulting from bolt torques. The three sides of the indentations 45 tend to grip the ends 47 of the chopper blades. This construction compensates for dimensional variances in the axial lengths of the blades. The maximum length will be when both sides of the axially longest blade are in contact with the axially inward surfaces of the retainers 32. The sides of the blades 28 not in contact with the axially inward surfaces of the retainers 32 are restrained from radially outward movement due to centrifugal force by contact with the copper rings. The indentations 45 also assist the tire 30 in restraining circumferential movement of the blades 38. The axially inward surfaces of the blade retainer 32 cooperate with the sides 47 of the trapezoidal blades to prevent the chopper blades from flying out of the blade roll cylinder member 29.

In a preferred embodiment of the present invention the blade retaining rings are comprised of copper. These copper rings are situated such that approximately 60% of the ring is within the recessed groove 34. The ends 47 of the chopper blades 28 crush the copper ring and form the indentations 45 discussed above. Other materials may be suitable for use as the blade retaining rings. The amount of the blade retaining ring positioned within the groove 34 is not critical so long as a sufficient percentage is recessed to prevent the ends 47 of the chopper blades 28 from completely cutting or tearing through the blade retaining ring.

The apparatus of the present invention lends itself to modification and has utility even in those instances where certain of the features illustrated are eliminated. Accordingly, it is to be understood that the above description is to be read as illustrative of the invention and not in a restrictive sense.

We claim:

1. A chopper assembly for cutting strands into short lengths comprising:
  a. a blade roll comprising a blade roll cylinder member having a plurality of chopper blades projecting generally radially therefrom, each of the blades having a cutting edge, a base portion, and two sides; and blade retaining means; at least the radially outer portion of said blade roll cylinder member comprising a resilient, durable, elastomer having a predetermined thickness; said elastomer having a generally cylindrical outer surface configuration with a plurality of milled slots therein extending generally in an axial direction and having a depth less than the thickness of the elastomer; said milled slots having a thickness slightly less than the thickness of said base portion of said chopper blades so that the sides of the slots grip said chopper blades when said base portions of said chopper blades are positioned in said slots within said elastomer;
  b. backup roll adjacent to the blade roll;
  c. said elastomer of said blade roll having a Shore A hardness greater than the hardness of the outer circumferential surface of said backup roll;
  d. means for supplying strands between said blades and said back up roll;
  e. means for rotating said blade roll and said back up roll so that said strands delivered between said blades and said back up roll are cut into short lengths.

2. A chopper assembly according to claim 1 wherein said resilient, durable elastomer is a polyurethane.

3. A chopper assembly according to claim 2 wherein said outer circumferential surface of said backup roll is a polyurethane.

4. A chopper assembly according to claim 3 wherein the polyurethane of the outer circumferential surface of said backup roll is about 83 durometer and the polyurethane of the outer circumferential surface of said blade roll member is at least about 95 durometer.

5. In a cylindrical blade roll having an axis of rotation along its center line for use with a chopper assembly for cutting strands into short lengths comprising a blade roll cylinder member, a plurality of chopper blades projecting generally radially therefrom, each of the blades having a cutting edge, a base portion and two sides, and blade retaining means; the improvement comprising:
  a. said blade retaining means comprising an annular blade retainer positioned at each axial extremity of said blade roll cylinder member, each axially inward surface of said blade retainers having at least one annular groove therearound and a blade retaining ring positioned partially within said at least one annular groove of each of said blade retainers; said blade retaining ring being deformed around the sides of said chopper blades at each side thereof to restrain said chopper blades against movement.

6. A blade roll according to claim 9 wherein at least the radially outer portion of said blade roll cylinder member comprises a resilient, durable elastomer; said elastomer having a generally cylindrical outer surface configuration with a plurality of milled slots therein extending generally in an axial direction, said milled slots having a thickness slightly less than the thickness of said base portion of said chopper blades so that the sides of the slots grip said chopper blades when said chopper blades are positioned in said slots.

7. A blade roll according to claim 5 wherein a plurality of annular grooves are formed in each axially inward surface of said blade retainers, and a blade retaining ring is positioned partially within each of said plurality of annular grooves.

8. A blade roll according to claim 7, wherein said blade retaining rings are copper.

9. A blade roll according to claim 8 wherein said blade retaining rings are positioned in said annular grooves such that 60% of said rings are situated within said annular grooves.

10. A blade roll according to claim 6 wherein the base of said chopper blade extends in an axial direction a distance longer than the axial extent of the cutting edge of said chopper blade and wherein at least one of said blade retaining rings has a diameter less than the diameter of the outer surface of said blade roll cylindrical member.

11. A chopper assembly for cutting strands into short lengths comprising:
  a. a blade roll comprising a blade roll cylinder member, a plurality of chopper blades projecting generally radially therefrom, each of the blades having a cutting edge, a base portion and two sides;
  b. blade retaining means comprising an annular blade retainer positioned at each axial extremity of said blade roll cylinder member, each axially inward surface of said blade retainers having at least one annular groove therearound and a blade retaining ring positioned partially within said at least one annular groove of each of said blade retainers; said blade retaining ring being deformed around the sides of said chopper blades at each side thereof to restrain said chopper blades against movement;
  c. a back up roll adjacent to said blade roll;
  d. means for supplying strands between said blades and said back up roll; and
  e. means for rotating said blade roll and said back up roll so that said strands delivered between said blades and said back up roll are cut into short lengths.

* * * * *